United States Patent Office

2,851,422
Patented Sept. 9, 1958

2,851,422

AUTOMATIC TRANSMISSION FLUID

Allan Manteuffel, Union, and Paul R. Chapman and George R. Cook, Crystal Lake, Ill., assignors to The Pure Oil Company, Chicago, Ill., a corporation of Ohio No Drawing. Application November 7, 1952
Serial No. 319,416

13 Claims. (Cl. 252—75)

This invention is directed to a mineral oil base lubricating composition having improved viscosity-temperature susceptibility characteristics by enhancing the properties of viscosity index improvers. It is a further purpose of this invention to provide a high viscosity index mineral oil base automatic transmission fluid which will meet the requirements established by automatic transmission fluid manufacturers for fluids to be employed in automatic transmissions. This invention is more specifically concerned with the preparation of a high viscosity index automatic transmission fluid having excellent low temperature fluidity characteristics.

In order that lubricating oil compositions employed to lubricate machinery in recurrent operation such as automobile engines will function with maximum efficiency in preventing mechanical wear, it is essential that the lubricant circulate as soon as the machinery is started. Thus for this type of service it is essential that the change in viscosity of the lubricant with temperature be relatively small but yet have a sufficient viscosity at the engine operating temperature to minimize oil consumption and provide an oil seal. High viscosity index is a criteria of this desirable viscosity temperature relation. Although viscosity index characteristics are important in lubricants employed in automobile engines, extensive use of mineral oil compositions in the operation of automatic transmissions employed in automotive vehicles has required the development of high viscosity index mineral oil compositions which among other properties must also have excellent low temperature characteristics. Although automatic transmissions have sporadically been employed in automotive vehicles since the dawning days of the automotive industry, it was not evident until the period immediately preceding World War II that the installation of automatic transmissions in automobiles would become general. Along with the development of various mechanisms for automatically transmitting power requiring a minimum of attention from the operator has arisen the need for suitable unctuous fluids which perform an essential function in the mechanical operation of the unit. Operation of these complex mechanisms requires that the fluid function in several different capacities. It not only serves as a lubricant and coolant in reducing the friction and heat developed therefrom encountered during the operation of the mechanism but also functions hydrokinetically in the fluid coupling or torque converter, depending upon the type of transmission, and in the hydraulic operation of the various mechanical components of the driving unit. Naturally occurring oils of mineral origin even upon subsequent refining do not possess inherently the characteristics which would enable them to perform satisfactorily in this demanding duty. However, refined mineral oils or admixtures of refined mineral oils will serve as a base wherein various extrinsic adducts can be admixed to complement and supplement the indigenous properties of the oil. In order to give complete satisfaction in all types of automatic transmissions it is necessary that the oil possess a high degree of oxidation resistance because of the several operating conditions to which the oil is exposed. Extreme pressure and lubricity properties are required in order to ease the heavy gear loads and eliminate the squawking or chattering which may develop during the frictional engagement of the various elements of the gear train section of the transmission. Furthermore, the fluid must be chemically inactive in order that the various materials of construction employed in fabricating the components of the transmission be not inimically affected. The fluid must possess excellent low temperature characteristics which will permit the transmission to operate efficiently through a wide range of atmospheric conditions. As one phase of low temperature fluidity, it is required that the blended product have a high viscosity index.

It is well established in the prior art that naturally occurring viscosity-temperature susceptibility characteristics of mineral oils are improved by the addition of addends known as viscosity index improvers which are high molecular weight compounds having high viscosity index characteristics. It is also known that the properties of these viscosity index improvers can be enhanced by adding to the mixture materials having poor solubility characteristics, for example, dibutoxy ethyl phthalate. According to this invention it has been discovered that extracts obtained in producing high quality lubricating oils by solvent refining may also be used to advantage to improve the efficiency of viscosity index improvers. It has also been found that these extracts will provide a blended automatic transmission fluid with excellent low temperature characteristics.

It is therefore an object of this invention to improve further the viscosity index characteristics of a mineral oil base lubricating composition containing a viscosity index improver. It is also an object to provide a blend of materials in a mineral oil base which will have the requisite properties of a satisfactory automatic transmission fluid. It is a further object of this invention to provide a mineral oil base prepared from a blend of mineral oils having different characteristics which will permit the blended fluid to meet the difficult low temperature fluidity requirements without the need for special functional additives.

Although this invention is concerned with improving the viscosity index of lube oils generally, in order to obviate a discussion of the application of this invention to several species of lubricating oils having improved viscosity index characteristics, this invention will be illustrated by considering its application in the formulation of automatic transmission fluid compositions. In order to determine whether a fluid has the necessary special properties which permit its use in automatic transmission fluids, rigorous specifications have been established by various manufacturers and an oil must conform with these specifications before it will officially be approved for use in a particular manufacturer's equipment. One leading manufacturer, in addition to actually testing the fluid in a transmission under normal conditions of use, requires that the oil be subjected to specific laboratory tests which must be met before the fluid is acceptable for use in the transmissions built by this manufacturer. These laboratory tests not only include standard tests devised by the American Society of Testing Materials but also other tests originated by the various manufacturers of automatic transmission fluids which are indicative of special properties of the automatic transmission fluid. One such typical test has been developed by the General Motors Corporation and, in essence, consists of the testing of the fluid under performance conditions in a transmission unit of an automobile under road conditions. From a dead stop the vehicle is accelerated at full throttle through a complete shifting cycle and subsequently decelerated again to a dead stop. The test is repeated until the fluid is proven to pass or fail. An oil which does not eliminate squawk will fail after five or six cycles. A fluid must successfully pass this test without the presence of any chattering or squawking during the shifting cycles in order to be acceptable. Other tests employing full scale equipment have been devised which provide conditions for investigating the squawking and chattering propensities of a fluid. A typical durability test consists of testing the fluid in an automatic transmission which is coupled to a conventional internal combustion engine. The transmission oil is maintained at a temperature of about 275° F. and by means of appropriate external control devices the automatic transmission is operated continuously for a number of shifting cycles which consists of a 15-second idling period during which time the motor maintains a constant speed of 400 revolutions per minute. Thereafter the engine is operated under wide open throttle for 45 seconds during which time the transmission unit shifts through all the torque ratios available. A constant load of 170 pound-feet of torque is maintained on the output shaft of the transmission. This test is conducted for 100 hours during which time the transmission will pass through 6000 cycles. After the test, the transmission is disassembled and observed for cleanliness and corrosion. In addition, the specifications for particular types of automatic transmission units provide that the fluid must also pass a bearing test devised by the General Motors Company which is described in the SAE Quarterly Transactions, July 1947, 1 (1) 56, et seq. In this test a bearing lubricated by the fluid undergoing testing is subjected to a rotating load type of force by the use of centrifugal weights. Both of these tests must be successfully passed before an automatic transmission fluid can be said to have the non-chattering or non-squawking qualities required of an acceptable fluid. This property unfortunately is not found in ordinary mineral oil base fluids and must be supplied by means of a suitable additive which is blended in as a component of the completed formulation. The effect of the fluid on the various metallic and non-metallic components of the mechanism is noted.

Furthermore, due to the extended use of the fluid and the wide range of climatic conditions under which the transmission units will operate, it is essential that the fluid be an all season fluid, ideal for year round operation. Therefore the low temperature characteristics, such as pour point, viscosity, viscosity index, and low temperature fluidity, of the fluid must be such that installations utilizing these units may be effectively operated at low temperatures. The pour point of the mineral oil base is advantageously modified by the use of additive agents such as pour point depressants. However conformity with the pour point specification as determined by the ASTM cloud-pour point test, D97–47, is not completely indicative of acceptable low temperature characteristics. As pointed out above, high viscosity index is also important. This empirical number which indicates the effect of change of temperature on the viscosity of an oil can be calculated by the standard ASTM method, D567–41.

In a further test of the low temperature characteristics, the power transmission fluid is subjected to the so-called low temperature fluidity test. This is an empirical test developed by the General Motors Company and it is run as follows:

One pint of fluid under test is put into a one-quart friction-top paint can. A hole is cut in the center of the top to receive a stopper which will hold an ASTM cloud and pour thermometer, the bulb of which is immersed in the fluid. The can and the contents are heated to 115° F. in a bath maintained at 118° F. After reaching the 115° F. temperature, the can and contents are allowed to cool to room temperature overnight, approximately 15 hours. The thermometer is replaced with a suitable low temperature thermometer and the can and contents are then placed in a refrigerating means such as a −45° F. cold box or cold room for eight hours. After eight hours the lid is removed and the can is laid on its side. The flow of the liquid to the edge of the can is then timed in seconds. The time for the test fluid is then compared with the time for a standard reference fluid furnished by General Motors Corporation. This test will hereinafter be referred to in the specification and appended claims as the G. M. low temperature fluidity test. Also, in determining whether or not an automatic transmission fluid has suitable low temperature characteristics, the blended product is tested by means of a standard dynamometer procedure in which the mechanism is operated in a cold room maintained at subzero temperatures of about −30° F.

In addition to the foregoing tests, there are numerous other physical and chemical tests which must be met by an automatic transmission fluid. Illustrative of the rigorous requirements established by one transmission manufacturer is the tabulated summary of detailed specifications compiled in Table I.

TABLE I

*Detailed requirements for passenger car automatic transmission fluid*

| Test | Requirements |
|---|---|
| 1. Miscibility | Pass. |
| 2. Viscosity, Saybolt Universal, 210° F | 49 min. |
| Viscosity, Saybolt Universal, 210° F | (*). |
| 3. Viscosity, Saybolt Universal, 0° F | 7,000 max. |
| 4. Viscosity Index | (*). |
| 5. Flash Point | 320. |
| 6. Fire Point | 350. |
| 7. Pour Point | −35 max. |
| 8. Copper Strip Test | Pass. |
| 9. Anti-Foaming Properties | Pass. |
| 10. Heating Test | Pass. |
| 11. Non-Corrosion and Non-Rusting Properties. | Pass. |
| 12. Effect on Seals | Pass. |
| 13. Odor | Pass. |
| 14. Non-Toxic Properties | Pass. |
| 15. Oxidation Test on Fluid as Marketed | Pass. |
| 16. Oxidation Test on Fluid Diluted With Equal Volume of Reference Oil. | Pass. |
| 17. Non-Chatter or Squawking Properties | Pass. |
| 18. Durability (Cycling) Test | Pass. |
| 19. Viscosity Stability, Change in Viscosity During Durability (cycling) or Performance Test: | |
| Saybolt Universal, 210° F | 46.5 min. |
| Saybolt Universal, 0° F | 7,000 max. |
| 20. Frictional Properties | Pass. |
| 21. Performance in Transmissions Under Service Conditions. | Pass. |
| 22. G. M. Low Temperature Fluidity Test (8 hrs. at −45° F.). | As good as or better fluidity than manufacturer supplied Reference Oil under the same test conditions. |
| 23. Cold Room Dynamometer Test | Pass. |

*To permit some freedom in choice of oil stocks no maximum viscosity at 210° F. or viscosity index is specified.

It is thus seen that a formulation which will meet these required specifications must of necessity be complex and require a delicate balancing of the constituents in order that each component will function in its desired capacity without deleteriously influencing the effects of the other components as well as the overall result. Therefore, according to one feature of this invention, a blend of addends in a mineral oil base has been discovered which will provide an automatic transmission fluid which will give complete satisfaction in all types of automatic transmissions currently manufactured.

In the instant invention the automatic transmission fluid is prepared by incorporating in a mineral oil base a plurality of suitable addends which complement and supplement the inherent characteristics of the base stock. In preparing the mineral oil base employed in the instant invention, a major portion of a refined lubricating oil base stock is blended with a minor portion of an extract obtained from the solvent extraction refining of raw lubricating oil distillates to produce lubricating oils having high viscosity index and improved stability characteristics. In selecting a suitable lubricating oil base stock it is necessary to consider its viscosity, oxidation stability and effect on rubber as well as other characteristics of mineral oil and the various additives contained therein. Although solvent refined oils are preferred, conventionally refined oils may in some instances be employed as components in the mineral oil base. In consideration of the viscosity requirements of the final blend, a neutral lubricating oil of suitable viscosity should be the major constituent of the lube oil portion of the mineral oil base. Although a neutral oil may constitute the entire lubricating oil fraction of the base, it is preferred that a blend of a neutral and a bright stock be used because a blend of these components exhibits a blending phenomenon and will have viscosity index in excess of the viscosity index of the individual oils. Illustrative of the effect of mineral oil variation on low temperature fluidity as well as other properties of the fluid are the data in Table II.

blends 3 and 4 in which various admixtures of Mid-Continent neutrals and bright stocks were blended with highly refined California neutral lubricating oils. It will be seen from blend 2 that although a satisfactory material with respect to the flash and fire requirements can be prepared by blending a 100 V. I. Mid-Continent neutral with a highly refined California neutral lubricating bright stock, this blend did not pass the G. M. low temperature fluidity test. This perversity of various mineral oils is also seen from the results reported for the remaining blends. In the instant composition Mid-Continent oils are employed to produce a formulation having the desired characteristics. The second constituent of the mineral oil base is an extract obtained from the solvent treating of lubricating oils. It is well known that solvent refining of lubricating oils produces the desirable product as a raffinate having an improved viscosity index and oxidation resistance. The extract recovered from the refining process contains the undesirable materials such as low viscosity index constituents removed from the feed stock. Although various solvents such as phenol, furfural, $SO_2$, nitrobenzene and Chlorex (beta,beta dichlorodiethylether) are used in solvent refining, the solvent refining processes and products produced therefrom

TABLE II

*Effect of mineral oil variation on low temperature fluidity*

| Blend No. | Blend Components—Weight Percent | | | | | | | | | Additive Portion* | Viscosity (SUS) | | Vis. Index | G. M. Low Temperature Fluidity Test | | Pour Point (° F.) | (*) Flash (° F.) | (*) Fire (° F.) |
|---|---|---|---|---|---|---|---|---|---|---|---|---|---|---|---|---|---|---|
| | 1 | 2 | 3 | 4 | 5 | 6 | 7 | 8 | 9 | | 100° F. | 210° F. | | (sec.) | G. M. Ref. Fluid (sec.) | | | |
| 1 | | 14.0 | | | | | | 71.5 | | 14.5 | 193.5 | 52.8 | 150 | 4 | 7 | -60 | 260 | 305 |
| 2 | 56.5 | | | | | | | | 29.25 | 13.80 | 188.5 | 51.5 | 148 | 115 | 7 | -40 | 375 | 415 |
| 3 | | 14.0 | | | | | 71.5 | | | 14.5 | 198.3 | 53.5 | 150 | 1 | 7 | B-55 | 300 | 330 |
| 4 | 35.75 | 14.0 | | | | | 35.75 | | | 14.5 | 212 | 55.4 | 151 | 3 | 7 | -50 | 295 | 335 |
| 5 | | | | | 75.25 | 11.50 | | | | 12.80 | 208 | 54.1 | 149 | 171 | 7 | -25 | | |
| 6 | | 11.50 | | | | 75.25 | | | | 12.80 | 207 | 53.8 | 148 | 102 | 7 | -25 | | |
| 7 | | 11.50 | | | 75.25 | | | | | 12.80 | 198.5 | 53.5 | 150 | Solid | 15 | -30 | | |
| 8 | | 10.5 | | 75.25 | | | | | | 13.80 | 313 | 60.1 | 132 | 19 | 15 | -50 | | |
| 9 | | 4.5 | | 82.5 | | | | | | 12.55 | 219.9 | 50.7 | 126 | Solid | 15 | -50 | | |
| 10 | | 4.5 | | 83.5 | | | | | | 11.55 | 211.6 | 50.0 | 126 | 29 | 17.5 | -45 | | |
| 11 | | 10.5 | 75.25 | | | | | | | 13.80 | 277 | 58.1 | 137 | 24.5 | 15 | -50 | | |
| 12 | | 4.5 | 82.5 | | | | | | | 12.55 | 193.8 | 49.4 | 134 | Solid | 17.5 | -45 | | |

*Additive portion comprises an admixture of proprietary lubricating oil addends consisting of a pour point depressant, V. I. improver, detergent-antioxidant, and anti-squawk agent.

1. 100 V. I. Mid-Continent Neutral.
2. 100 V. I. Mid-Continent Bright Stock.
3. Gulf Coastal 100 Vis. Solvent Refined.
4. Gulf Coastal 100 Vis. Pale.
5. Dewaxed Oils—100 V. I. 80 Neutral.
6. Dewaxed Oils—150 Bright Stock.
7-8-9. Highly Refined California Neutral Lubricating Oil Distillates Having the Following Properties:

| | Vis. at 100° F., SUS | V. I. | Pour Point, ° F. |
|---|---|---|---|
| 7 | 54.3 | 9 | <-80 |
| 8 | 58.0 | 38 | <-80 |
| 9 | 145.3 | 36 | -60 |

It is thus seen from the data in Table II that although desirable characteristics are in some instances obtained from the use of various oils, these advantages are offset by concurring undesirable characteristics. For example, while a substantial improvement in low temperature fluidity was experienced when the highly refined California neutral lubricating oils were employed, it is seen that the flash and fire points of these blends were far below the minimum requirements of the specifications in Table I which show that a minimum flash point of 320° F. and a fire point of 350° F. is necessary. Similarly unsatisfactory flash and fire values were obtained in are essentially the same. According to the instant invention it has been found that the use of minor amounts of a solvent extract produced in the solvent refining of a lubricating oil stock can be used to enhance the viscosity index and other low temperature fluidity characteristics of the final blend containing the mineral oil base and the several additives employed. Hereinafter in the specification and claims this material will be referred to as solvent extract obtained in the solvent refining of lubricating oil stocks to produce a lubricating oil having an improved viscosity index and increased resistance to oxidation.

It should be noted in connection with the use of solvent extracts that the solvent extracts obtained from the solvent refining of neutral lubricating oil stocks are preferred in preparing the mineral oil base utilized in formulating the automatic transmission fluid because of the viscosity limitations on the final blend. However, this invention in its broadest aspect is not limited to the use of these specific solvent extracts and solvent extracts obtained from the solvent refining of bright stock lubricating oil stocks may be utilized in lubricating oil formulations where enhancement of the viscosity index characteristics of the lubricant is desired but where viscosity of the blend is not too important such as in the preparation of gear oils. Conversely where viscosity of the blend is important, solvent extracts from the solvent refining of bright stocks may be used where the use of a less viscous light lubricating oil distillate may be employed as the major portion of the mineral oil base to provide a suitable lubricant or the viscosity of the solvent extract from the solvent refining of bright stock lubricating oil stocks may be modified by admixing minor amounts of kerosene or other light petroleum distillate without affecting the viscosity index enhancing quality of the lubricating oil. Included in Table III are the physical characteristics of several illustrative but nonlimiting examples of solvent extracts that may be employed in carrying out the instant invention.

an automatic transmission fluid than is otherwise devoted to the attaining of oxidation stability, non-corrosiveness, non-foaming and other similar requirements. It is in this regard that the use of phenol extract in preparing automatic transmission fluids is especially advantageous. Specific requirements which are indicative of low temperature fluidity include pour point, viscosity index, low temperature fluidity tests and cold room dynamometer tests. Because of the effectiveness of proprietary pour point depressants and viscosity index improvers, no difficulty in conforming with the specified requirements of pour point and viscosity index is generally experienced. For this purpose commercially available pour point depressants such as the low molecular condensation products of a chlorinated paraffin wax and a phenol may be used. This type of additive may be used in the concentrated or diluted product wherein a mineral oil has been added to the condensation product in order to reduce its viscosity. In general, however, any pour point depressant which will produce a pour point of about −35° F. or lower in the finished blend may be employed. Although the wax phenol condensation product described above is preferred, other pour point depressants such as acrylic and methacrylic acid ester polymers may be used. Similarly in providing a suitable viscosity index, mineral oil viscosity index improvers such as high molecular

TABLE III

*Physical properties of phenol extracts*

| Extract No. | API Gravity | Vis./100° F. | Vis./130° F. | Vis./210° F. | V. I. | Pour, °F. | Percent Carbon Residue | Percent Sulfur |
|---|---|---|---|---|---|---|---|---|
| 1 | 13.3 | 340 | 138 | 46.4 | −32 | +35 | 0.13 | 2.45 |
| 2 | 21.8 | 94.7 | 60.3 | 37.7 | +33 | +45 | | 1.48 |
| 3 | 14.1 | 351 | 142 | 47.1 | −22 | +40 | | 2.27 |
| 4 | 8.4 | 1,766 | 483 | 68.8 | −115 | +40 | | 3.10 |
| 5 | 12.9 | 901 | 301 | 61.5 | −16 | +30 | | 2.48 |
| 6 | 11.3 | 1,672 | 483 | 71.1 | −73 | +35 | | 2.65 |
| 7 | 10.5 | 12,676 | 2,514 | 172.1 | −101 | +60 | | 2.88 |
| 8 | 13.7 | 25,000 (Ext.) | 5,400 (Ext.) | 355 | +27 | +80 | | 2.18 |
| 9 | 11.1 | 23,319 | 4,750 | 282 | −40 | +55 | 7.2 | 2.66 |
| 10 | 15.4 | 15,000 | | 285 | +39 | | | |
| 11 | 12.6 | 36,410 (Ext.) | 4,310 (Ext.) | 310.1 | −1 | +80 | 4.7 | 2.27 |
| 12 | 14.6 | 19,500 (Ext.) | 4,305 (Ext.) | 313 | +27 | +90 | 4.7 | 2.2 |
| 13 | 15.4 | 32,500 | | 372 | +5 | +60 | 4.13 | 2.33 |
| 14 | 8.6 | 145,000 (Ext.) | 19,000 (Ext.) | 616 | 0 | +70 | | |

Although the blending phenomenon used in preparing the refined lubricating oil fraction of the mineral oil base does give an appreciation in viscosity index, one feature of the instant invention is manifested in Table IV where further enhancement in viscosity index is obtained by employing small amounts of solvent extract in the mineral oil base.

weight polymers of esters may be used. A preferred material in this regard is the viscosity index improver formed by polymerizing the ester prepared by reacting an alcohol with acrylic acid to produce a polymeric ester of the acrylic acid series. Typical products of this type are the polymers of amyl, hexyl, octyl, decyl or octodecyl esters of acrylic or α-methacrylic acids. Mixtures

TABLE IV

*Relative effect of extract from production of neutral lube oil stock by solvent refining on viscosity index improvement*

| Blend No. | Percent Composition By Weight | | | | | | | Viscosity (SUS) | | Viscosity Index |
|---|---|---|---|---|---|---|---|---|---|---|
| | 100 Vis. Neutral Oil | Bright Stock Oil | Solvent Extract From 100 Viscosity Neutral* | Pour Point Depressant | Detergent-Anti-Oxidant | V. I. Improver | Anti-Squawk | 100° F. | 210° F. | |
| 1 | 75.25 | 11.50 | | 0.75 | 4.0 | 5.0 | 3.5 | 196.7 | 53.5 | 151 |
| 2 | 75.25 | | 11.50 | 0.75 | 4.0 | 5.0 | 3.5 | 169.2 | 50.9 | 155.2 |

*For characteristics of solvent extract see Extract No. 1, Table III.

Although no more important than other requirements of an accepted automatic transmission fluid, the low temperature fluidity characteristics, because of their elusive nature, require more attention in the formulation of of the long chain polymers may likewise be used as well as copolymers of at least two different alcohol esters having an alcohol group with less than 6 carbon atoms and the other of α-methacrylic acid, one having an alcohol group of at least 5 carbon atoms. Although these polymeric esters of the acrylic acid series are preferred in general, polymeric materials having viscosities of about 3000 to 3400 SUS at 210° F. and specific gravities less than that of water are useful. Also, in accordance with one feature of this invention, solvent extract in combination with viscosity index improver functions meet the viscosity index requirements of 135 to 150.

Compliance with these requirements, however, does not assure that the blend will pass the G. M. low temperature fluidity test or so-called paint can test alluded to above. In order to assure that these requirements are met, it has been discovered that it is necessary to incorporate in the blend formulation a minor amount of the solvent extract described in the aforementioned discussion of the preparation of the mineral oil base used in the preparation of the automatic transmission fluid. This feature of the instant invention is illustrated by Table V.

TABLE V

| | (1) | (2) | (3) | (4) |
|---|---|---|---|---|
| Composition, Percent By Weight: | | | | |
| 80 Vis. Neutral | 70.0 | | 76.1 | |
| 100 Vis. Neutral | | 82.5 | | 79.1 |
| 150 High V. I. Bright Stock | 12.5 | 4.5 | 7.5 | 5.0 |
| Solvent Extract from Neutral Production* | | | 4.5 | 4.5 |
| V. I. Improver | 5.5 | 3.0 | 5.0 | 3.0 |
| Detergent-Anti-Oxidant | 4.0 | 4.0 | 4.5 | 4.0 |
| Pour Point Depressant | 5.0 | | | |
| Pour Point Depressant Conc. | | 1.5 | 0.75 | 0.75 |
| Sulfurized Sperm Oil | 4.5 | 4.5 | 2.0 | 3.5 |
| Oleic Acid | | | 0.15 | 0.15 |
| Anti-Foam Agent | 0.001 | 0.001 | 0.001 | 0.001 |
| Characteristics: | | | | |
| Viscosity 100 | 204 | 198 | 183.9 | 175.2 |
| Viscosity at 210° F | 55.2 | 51 | 52.1 | 50.7 |
| Viscosity at 0° F. (Extrap) | 4,000 | 5,800 | 3,700 | 3,700 |
| Viscosity Index | 153 | 140 | 151.5 | 149 |
| Flash, ° F | 370 | 415 | 390 | 410 |
| Fire, ° F | 415 | 450 | 425 | 445 |
| Actual Pour Point, ° F | B−35 | B−35 | −50 | −55 |
| Color, N. P. A | | | +8 | 7+ |
| Conradson, C. R., Percent | 0.76 | 0.66 | 0.69 | 0.69 |
| Ash as SO₄ | 0.61 | 0.57 | 0.70 | 0.60 |
| Neut. #48 | 0.01 | 0.01 | 0.30 | 0.31 |
| Sap. # | 7.8 | 7.8 | 4.4 | 6.5 |
| A. P. I. Gravity | 32.2 | 30.6 | 31.3 | 30.0 |
| S, Percent | 0.72 | 0.67 | 0.53 | 0.57 |
| Rubber Seal Oven Test | Pass | Pass | Pass | Pass |
| Low Temperature Fluidity, sec. | Solid (fail) | Solid (fail) | 5 Pass | 9 Pass |
| Low Temperature Fluidity, of G. M. Reference Oil, sec. | 14 | 14 | 13 | 13.5 |
| Cold Room Dynamometer Test | Fail | Fail | Pass | Pass |

*For characteristics of solvent extract see Exhibit No. 1, Table III.

From the data reported in Table V it will be seen that the low temperature fluidity is enhanced by the addition of minor amounts of solvent extract to the blended product. Although the data shown in Table V indicate that 4½ percent by weight of solvent extract is employed, this proportion is only illustrative of the preferred amount and amounts between 1.0 to 20 percent may be used. When the extract was used in the finished blend, there was no inimical effect noted in the viscosity index nor on the engine cleanliness as evaluated by the Chevrolet L-4 engine test.

Also related to the low temperature fluidity characteristics of the final blend are the various additives that may be employed to eliminate the anti-squawk and chattering phenomena peculiar to automatic transmissions which employ multi-disk drive clutches and speed range bands as component elements of the mechanism. Although a preferred anti-squawk agent is sulfurized sperm oil, it has been found that indiscriminate use of this material might result in a deleterious effect on the low temperature fluidity of the blended product. As substituents for this material, other sulfurized esters of mono or dihydric alcohols may be employed such as a sulfurized mixture of methyl oleate and methyl abietate or sulfurized dioleate of propylene glycol. It is preferred, however, because of the protection against bearing corrosion which is afforded by the use of sulfurized sperm oil that sulfurized sperm oil be used. If sulfurized sperm oil is employed in the formulation, another feature of this invention is illustrated in Table VI wherein it is shown that increased amounts of sulfur may be included if desired in the final blend by employing small amounts of solvent extract. This permits the low temperature fluidity requirement to be met even though the use of larger amounts of conventional fluidity improving addends in the absence of solvent extract will not effect this end. This property of solvent extracts to enhance the low temperature fluidity of mineral oil blends containing sulfurized sperm oil is also used to advantage in formulating gear oil compositions where larger amounts of sulfur are desirable. In this instance, while a low temperature fluidity comparable to automatic transmission fluids is not required, the low temperature fluidity of sulfurized sperm oil-containing gear oils can be enhanced by the addition of small amounts of solvent extract to obtain desirable non-channeling characteristics in gear oils at low temperatures. A test procedure for determining channeling characteristices of gear oils is described in the C. R. C. Handbook, 1946 edition, Coordinating Research Council, Inc., under the CRC designation L–15–445.

A further precaution should also be observed in using sulfurized sperm oil as an ingredient in the blended composition. Obviously the weight percentage of sulfur in the blend depends upon the amount of sulfur in the sulfurized sperm oil and the quantity of sulfurized sperm oil. Therefore, inasmuch as an exceptional increase in viscosity of sulfurized sperm oil occurs when more than 8 percent sulfur is added to the sperm oil and the sulfurized oil processed to good corrosion, it is preferred that the sperm oil contain less than 8 percent sulfur because this permits a much easier control of the low temperature fluidity properties of the final blend.

TABLE VI

The effect of solvent extract on mineral oil compositions containing sulfurized sperm oil

| | Blend A | Blend B |
|---|---|---|
| Neutral Lubricating Oil | 75.25 | 74.25 |
| High V. I. Br. Stk. Lubricating Oil | 10.5 | 7.0 |
| Solvent Extract From Neutral Oil Refining* | | 4.50 |
| Pour Point Depressant | 0.75 | 0.75 |
| Detergent-Anti-Oxidant | 4.00 | 4.00 |
| V. I. Improver | 5.00 | 5.00 |
| Anti-Squawk Agent (Sulfurized Sperm Oil Containing 10% S) | 4.50 | 4.50 |
| Viscosity: | | |
| At 100° F | 206.4 | 192.9 |
| At 210° F | 54.4 | 52.4 |
| V. I. | 150 | 149 |
| Actual Pour, ° F | −55 | −40 |
| G. M. Low Temperature Fluidity Test, Sec. | 44 (fail) | 12 (pass) |
| G. M. Reference Fluid, Sec. | 15 | 17.5 |

*For characteristics of solvent extract see Extract No. 1, Table III.

It should also be noted that oleic acid may be used to impart anti-squawk properties to the blended product without deleteriously effecting the low temperature fluidity of the blend. Therefore, it is preferred when employing sulfurized sperm oil in order to take advantage of any bearing corrosion inhibition properties and any anti-squawk properties which this additive imparts, that small amounts of oleic acid, of the order of 0.1 to 0.4% by weight or some other highly polar long chain molecule be added to the blended product. In this instance it is unnecessary to add sulfurized sperm oil in amounts above 2 percent by weight.

The necessary detergent and anti-corrosion properties of the finished automatic transmission fluid are obtained through the use of multi-functional additives normally used in engine lubricating oils. Such additives are designed to promote engine cleanliness and/or act as bearing corrosion inhibitors. Numerous additives including heavy metal, alkaline earth salts and alkali metal salts and soaps containing sulfur, nitrogen and phosphorus are available for this purpose. A preferred additive in this regard is an oil soluble polyvalent metal salt of an alkylated hydroxy aryl sulfide mixed with selected alkaline earth metal sulfonates which is described in United States Patent 2,379,241. A specific example of this product is the barium salt of hydroxy diisobutyl phenol sulfide in admixture with calcium sulfonate.

It is thus seen that the instant invention provides a high viscosity index mineral oil base lubricating oil wherein a solvent extract is employed in conjunction with a viscosity index improver to provide a viscosity index in excess of that attained by the use of high molecular weight polymers conventionally employed in small amounts to improve the viscosity index. The invention has application in the formulation of blended products which may be used as engine lubricating oils or automatic transmission fluids which conform to the rigorous specifications established for unctuous substances employed as operating media in automatic transmissions. In addition to enhanced viscosity index, these blended products also have excellent low temperature fluidity characteristics imparted thereto by the addition of minor proportions of the solvent extract which is not provided solely by the addition of conventional viscosity index improvers and pour point depressants.

Therefore, we claim as our invention:

1. A high viscosity index lubricating oil composition comprising a mineral oil base and sufficient amounts of a high molecular weight polymerized ester of the acrylic acid series to impart high viscosity index characteristics to said composition, said mineral oil base comprising a major portion of a refined lubricating oil stock and a minor portion of a solvent extract obtained from the solvent refining of lubricating oil stocks to produce a lubricating oil having an improved viscosity index and increased resistance to oxidation in an amount sufficient to enhance the low temperature fluidity improving characteristics of said high molecular weight polymer as indicated by the G. M. low temperature fluidity test.

2. A composition in accordance with claim 1 in which the refined lubricating oil stock is obtained from a Mid-Continent crude.

3. A composition in accordance with claim 2 in which the mineral oil base contains 1 to 20 percent by weight of said solvent extract.

4. A composition in accordance with claim 3 in which said solvent extract is phenol extract.

5. A mineral oil composition having improved low temperature fluidity characteristics suitable for use in automatic transmissions to which has been imparted detergency, oxidation stability, and anti-squawk properties by the addition of suitable additives which comprises a mineral oil base having incorporated therein minor proportions of a pour point depressant in an amount sufficient to provide a composition having a pour point not higher than −35° F., and a polymeric ester of the acrylic acid series in an amount sufficient to produce a composition having a viscosity index of not less than 135, said mineral oil base comprising a major portion of a Mid-Continent lubricating oil base stock and a portion of a solvent extract obtained from the solvent refining of lubricating oil stocks to produce a lubricating oil having an improved viscosity index and increased resistance to oxidation in an amount sufficient to enhance the low temperature fluidity characteristics of the composition as determined by the G. M. low temperature fluidity test.

6. A composition in accordance with claim 5 in which the mineral oil base contains about 3 percent to 12 percent by weight of said solvent extract.

7. A mineral oil composition in accordance with claim 5 in which is incorporated sufficient amounts of a sulfurized sperm oil, containing not more than 8 percent by weight of sulfur, and oleic acid to impart anti-squawk properties to the said composition.

8. A composition in accordance with claim 6 in which said solvent extract is phenol extract.

9. A composition in accordance with claim 7 in which 0.5 percent to 5.0 percent of sulfurized sperm oil and 0.1 percent to 0.4 percent of oleic acid is employed.

10. A high viscosity index automatic transmission fluid having an A. S. T. M. pour point of not higher than −35° F., a viscosity index of at least 135 and a low temperature fluidity of not greater than 15 seconds as determined by the G. M. low temperature fluidity test which consists of the following composition:

| Mineral Oil Base | Weight Percent |
|---|---|
| Refined lubricating oil base stock | 83.1–85.6 |
| Solvent extract obtained from the solvent refining of lubricating oil stocks to produce a lubricating oil having an improved viscosity index and increased resistance to oxidation | 3–4.5 |
| Polymerized ester of the methacrylic acid series | 3.0–5.0 |
| Oil soluble polyvalent metal salt of an alkylated hydroxyl aryl sulfide admixed with select alkaline earth metal sulfonates | 4.0–4.5 |
| Condensation product of a chlorinated wax and a phenol | 0.75 |
| Sulfurized sperm oil | 2.0–3.5 |
| Oleic acid | 0.1–0.4 |

11. A composition in accordance with claim 10 in which said solvent extract is phenol extract.

12. A high viscosity index automatic transmission fluid having an A. S. T. M. pour point of not higher than −35° F., a viscosity index of at least 135 and a low temperature fluidity of not greater than 15 seconds as determined by the G. M. low temperature fluidity test which consists of the following composition:

| Mineral Oil Base | Weight Percent |
|---|---|
| Refined lubricating oil base stock | 84.6 |
| Solvent Extract obtained from the solvent refining of lubricating oil stocks to produce a lubricating oil having an improved viscosity index and increased resistance to oxidation | 3.0 |
| Polymerized ester of the methacrylic acid series | 5.0 |
| Oil soluble polyvalent metal salt of an alkylated hydroxyl aryl sulfide admixed with select alkaline earth metal sulfonates | 4.5 |
| Condensation product of a chlorinated wax and a phenol | 0.75 |
| Sulfurized sperm oil | 2.0 |
| Oleic acid | 0.15 |

13. A composition in accordance with claim 12 in which said solvent extract is phenol extract.

References Cited in the file of this patent

UNITED STATES PATENTS

| | | |
|---|---|---|
| 2,195,659 | Shoemaker | Apr. 2, 1940 |
| 2,361,522 | Zimmer et al. | Oct. 31, 1944 |
| 2,409,687 | Rogers et al. | Oct. 22, 1946 |
| 2,683,120 | Jennings et al. | July 6, 1954 |